(12) United States Patent
Deng et al.

(10) Patent No.: US 11,817,795 B2
(45) Date of Patent: Nov. 14, 2023

(54) SWITCHING POWER SUPPLY CIRCUIT

(71) Applicant: Silergy Semiconductor Technology (Hangzhou) LTD, Hangzhou (CN)

(72) Inventors: Jian Deng, Hangzhou (CN); Chen Zhao, Hangzhou (CN); Yunlong Han, Hangzhou (CN); Qiukai Huang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 137 days.

(21) Appl. No.: 17/477,775

(22) Filed: Sep. 17, 2021

(65) Prior Publication Data

US 2022/0103089 A1 Mar. 31, 2022

(30) Foreign Application Priority Data

Sep. 25, 2020 (CN) .......................... 202011026976.8

(51) Int. Cl.
*H02M 7/219* (2006.01)
*H02M 5/293* (2006.01)

(52) U.S. Cl.
CPC ............ *H02M 7/219* (2013.01); *H02M 5/293* (2013.01)

(58) Field of Classification Search
CPC ...... H02M 7/219; H02M 5/293; H02M 5/275; H02M 3/22; H02M 3/325
See application file for complete search history.

(56) References Cited

U.S. PATENT DOCUMENTS

| 7,227,277 | B2 | 6/2007 | Chapman et al. |
| 7,256,568 | B2 | 8/2007 | Lam et al. |
| 8,310,846 | B2 | 11/2012 | Piazzesi |
| 8,853,888 | B2 | 10/2014 | Khaligh |
| 9,130,460 | B2 | 9/2015 | Sun et al. |
| 9,257,916 | B2 | 2/2016 | Cheng et al. |
| 9,543,822 | B2 | 1/2017 | Hang et al. |
| 9,559,591 | B2 | 1/2017 | Hang et al. |
| 11,437,924 | B2 * | 9/2022 | Deng .................... H02M 7/219 |
| 11,611,282 | B2 * | 3/2023 | Deng ................ H02M 3/33592 |
| 2007/0052397 | A1 | 3/2007 | Thompson et al. |
| 2008/0231115 | A1 | 9/2008 | Cho et al. |
| 2008/0258688 | A1 | 10/2008 | Hussain et al. |
| 2012/0153729 | A1 | 6/2012 | Song et al. |
| 2013/0063180 | A1 | 3/2013 | Sun et al. |
| 2015/0078045 | A1 | 3/2015 | Zhang et al. |
| 2016/0211745 | A1 | 7/2016 | Hang et al. |
| 2017/0063238 | A1 | 3/2017 | Hang et al. |

(Continued)

FOREIGN PATENT DOCUMENTS

| CN | 107825973 A | 3/2018 |
| CN | 108736552 A | 11/2018 |

*Primary Examiner* — Adolf D Berhane

(57) ABSTRACT

A switching power supply circuit can include: an energy storage capacitor; a high-frequency switching network coupled to the energy storage capacitor, and being configured to receive a low-frequency AC input voltage, to charge the energy storage capacitor, to perform high-frequency chopping on the low-frequency AC input voltage and/or a voltage of the energy storage capacitor, and to generate a high-frequency AC signal; and a rectifier module coupled to the high-frequency switching network, and being configured to receive the high-frequency AC signal, to rectify the high-frequency AC signal, and to generate a DC signal.

20 Claims, 15 Drawing Sheets

(56) References Cited

U.S. PATENT DOCUMENTS

| | | | |
|---|---|---|---|
| 2017/0279279 A1 | 9/2017 | Shimada et al. | |
| 2018/0198361 A1 | 7/2018 | Seong et al. | |
| 2020/0099311 A1* | 3/2020 | Askarianabyaneh | H02M 7/217 |
| 2021/0194374 A1* | 6/2021 | Deng | H02M 1/4258 |
| 2021/0367525 A1* | 11/2021 | Deng | H02M 3/01 |
| 2023/0022357 A1* | 1/2023 | Chen | H02M 1/0025 |
| 2023/0030593 A1* | 2/2023 | Deng | H02M 3/33571 |

* cited by examiner

SWITCHING POWER SUPPLY CIRCUIT

RELATED APPLICATIONS

This application claims the benefit of Chinese Patent Application No. 202011026976.8, filed on Sep. 25, 2020, which is incorporated herein by reference in its entirety.

FIELD OF THE INVENTION

The present invention generally relates to the field of power electronics, and more particularly to switching power supply circuits.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
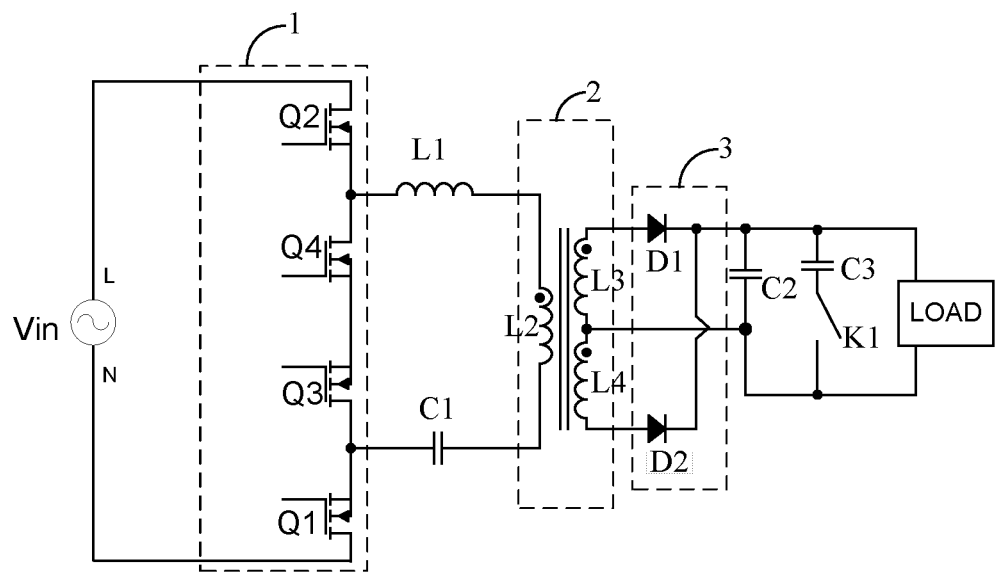
FIG. 1 is a circuit diagram of an example switching power supply circuit.

Many semiconductor electronic devices need a switching power supply circuit that converts AC power into DC power in order to obtain the DC power needed for operation from the AC mains network. Referring now to FIG. 1, shown is a circuit diagram of an example switching power supply circuit. The switching power supply circuit can include switching circuit 1, inductor L1, capacitor C1, transformer 2, and rectifier module 3. Switching circuit 1 can include power switches Q1, Q2, Q3, and Q4, which are sequentially connected to two terminals of the AC power supply. The AC power supply can generate AC input voltage Vin. Inductor L1, capacitor C1, and primary winding L2 of transformer 2 can connect in series between the common node of power switches Q2 and Q4 and the common node of power switches Q1 and Q3, and the secondary winding of transformer 2 can be coupled to rectifier module 3. By controlling the switching state of the power switch in switching circuit 1, inductor L1, primary winding L2, and capacitor C1 male operate in the LLC resonance state, and the output terminal of rectifier module 3 can generate a DC signal to charge the load. In addition, the switching power supply circuit can also include capacitor C2, capacitor C3, and switch K1. Capacitor C3 and switch K1 can connect in series and then may be coupled in parallel with capacitor C2 at the output terminal of energy storage module 3.

In order to maintain the load power when the input AC voltage is very low, switch K1 can be turned on such that capacitor C3 with a large capacity is coupled to the output terminal of rectifier module 3 (e.g., the output terminal of the switching power supply circuit), and thus the energy storage capacitor C3 can be used as a power supply for the load to maintain the output voltage of rectifier module 3. However, since capacitor C3 may be coupled to the output terminal of rectifier module 3, the current flowing through capacitor C3 can flow through the power switch and resonant cavity on the primary and secondary sides of the transformer, thus causing a large energy loss, which may reduce the efficiency of the switching power supply.

In particular embodiments, a switching power supply circuit can include: an energy storage capacitor; a high-frequency switching network coupled to the energy storage capacitor, and used to receive a low-frequency AC input voltage (e.g., a power frequency AC signal), charge the energy storage capacitor, and perform high-frequency chopping on the low-frequency AC input voltage and/or the voltage of storage capacitor and output a high frequency AC signal; and a rectifier module coupled to the high-frequency switching network, and used to receive the high-frequency AC signal, rectify the high-frequency AC signal, and output a DC signal. It should be noted that the low-frequency AC input signal can be a sine wave or other types of AC signals such as rectangular wave. For convenience, a sine wave example is utilized here in, but particular embodiments are not limited to this type of waveform. Also, the transformer can be a common transformer or a piezoelectric transformer.

The high-frequency switching network can include an energy storage module and a switching circuit. The energy storage module can be charged and discharged by controlling the switching state of the switching circuit to perform high-frequency chopping on the low-frequency AC input voltage and/or the voltage of the energy storage capacitor. Optionally, the switching power supply circuit may be isolated; that is, the input terminal and the output terminal of the switching power supply circuit need to be isolated. In addition, the high-frequency switching network can also include a transformer, whereby the energy storage module is coupled with the primary winding of the transformer, and the rectifier module is coupled with the secondary winding of the transformer. Optionally, the switching power supply circuit is non-isolated; that is, the input terminal and the output terminal of the switching power supply circuit are not isolated. In addition, the energy storage module can be coupled to the rectifier module. In most cases, in order to meet requirements of safety performance, the output terminal (load terminal) of the switching power supply circuit can be isolated from the input terminal (power terminal) of the switching power supply circuit, particularly when the low-frequency AC input voltage is the mains. Therefore, the following description mainly takes an isolated switching power supply circuit as an example, but particular embodiments may utilize other arrangements.

The energy storage module can include at least one inductor and/or at least one capacitor, and the energy storage module and the primary winding or the rectifier module can be coupled between first and second nodes to form different topological structures with the switching circuit. The difference among the number of the inductors and/or capacitors and the connection modes may lead to different topological structures. For example, the energy storage module can include an inductor or a capacitor. For example, the energy storage module can include a capacitor and a first inductor. For example, the energy storage module can include two capacitors and one inductor. Further, the high-frequency switching network may operate in the half-bridge and/or full-bridge state by controlling the switching state of the switching circuit, in order to perform high-frequency chopping the low-frequency AC input voltage and/or the voltage of the energy storage capacitor.

For example, when there is no capacitor in the energy storage module (e.g., only an inductor is included), the high-frequency switching network may operate in the half-bridge buck state and/or the full-bridge buck state by controlling the switching state of the switching circuit, in order to perform high-frequency chopping on the low-frequency AC input voltage and/or the voltage of the energy storage capacitor. In an isolated switching power supply circuit and when the energy storage module includes at least one capacitor, or in a non-isolated switching power supply circuit and when the energy storage module includes at least one capacitor and one inductor, the high-frequency switching network may operate in a half-bridge resonance state and/or a full-bridge resonance state by controlling the switching state of the switching circuit, to perform high-frequency chopping on the low-frequency AC input voltage and/or the voltage of the energy storage capacitor. If the switching frequency of the switching circuit cannot reach the resonant frequency, the high-frequency switching network may operate in a half-bridge converter and/or a full-bridge converter state to perform high-frequency chopping on the low-frequency AC input voltage and/or the energy storage capacitor, and the specific types of the half-bridge converter and the full-bridge converter can be related to the composition and connection mode of the energy storage module. In a non-isolated switching power supply circuit, when there is no inductor in the energy storage module (e.g., only a capacitor is included), the high-frequency switching network may operate in the charge pump state to perform high-frequency chopping on the low-frequency AC input voltage and/or the voltage of the capacitor.

The full-bridge state in particular embodiments may refer to: an active power supply (e.g., the low-frequency AC input voltage or energy storage capacitor) may be provided to provide power for the post-stage circuit or load in the first and second half of the switching cycle of the switching circuit. The half-bridge state in particular embodiments may refer to: in the first half of the working cycle of the switching circuit, an active power supply (e.g., the low-frequency AC input voltage or energy storage capacitor) may be provided to provide power for the post-stage circuit or load and charges the energy storage module. In the second half of the working cycle of the switching circuit, no active power supply may supply power to the post-stage circuit or load, and the energy storage module can discharge to provide power for the post-stage circuit or load.

In one example, the high-frequency switching network may operate in the entire cycle of the low-frequency AC input voltage, such that the rectifier module outputs a continuous current. In another example, the high-frequency switching network may only operate for a period of time in the cycle of the low-frequency AC input voltage, such that the rectifier module outputs current in the form of pulsation. The rectifier modules of all embodiments of the present invention as below can output continuous currents and pulsating currents. The switching power supply circuit of particular embodiments may have three operating states: the low-frequency AC input voltage can independently be used for supplying power to the post-stage circuit or load, the energy storage capacitor may independently be used for supplying power to the post-stage circuit or load, and both the low-frequency AC input voltage and the energy storage capacitor can be used for supplying power to the post-stage circuit or load. Moreover, in the process of the switching power supply circuit supplying power to the post-stage circuit or load, the above three operating states can work independently or in any suitable combination.

For example, when the absolute value of the low-frequency AC input voltage is greater than a first voltage threshold, the high-frequency switching network may receive the low-frequency AC input voltage, and can perform high-frequency chopping on the low-frequency AC input voltage. That is, the low-frequency AC input voltage may supply power for the post-stage circuit or load, and can charge the energy storage capacitor. In addition, the rectifier module may output current in the form of pulsation. For example, when the absolute value of the low-frequency AC input voltage is greater than the first voltage threshold, the high-frequency switching network may receive the low-frequency AC input voltage, and can perform high-frequency chopping on the low-frequency AC input voltage. That is, the low-frequency AC input voltage may supply power for the post-stage circuit or load, and can charge the energy storage capacitor. When the absolute value of the low-frequency AC input voltage is less than the first voltage threshold, the high-frequency switching network may perform high-frequency chopping on the voltage of the energy storage capacitor. That is, the energy storage capacitor may supply power for the post-stage circuit or load, and the rectifier module may output continuous current.

The rectifier module can be a rectifier circuit, such as a full-wave rectifier circuit and a full-bridge rectifier circuit. The power switch of particular embodiments can include various existing electrically controllable switch devices, such as metal-oxide-semiconductor field-effect transistors (MOSFET), bipolar-junction transistors (BJT), or insulated-gate bipolar transistors (IGBT). The output terminal of the switching power supply circuit of particular embodiments can be directly coupled to a load for power supply, such as supplying power for LEDs, charging batteries, etc. The switching power supply circuit of particular embodiments can control the output voltage and/or current of the switching power supply circuit by single-stage active control, frequency adjustment, etc.

In addition, the output voltage or/and current can be controlled by adjusting the switching state (e.g., switching frequency or duty cycle) of the switching circuit. The switching power supply circuit of particular embodiments can also be passively controlled and output in an open loop, and the switching power supply circuit can be used as a high-frequency transformer. The switching power supply circuit of particular embodiments can also be connected to a post-stage circuit at its output end, and the post-stage circuit is coupled with a load to supply power to the load, such as supplying power an LED, charging a battery, etc. The post-stage circuit may generally be a DC-DC conversion circuit. In addition, the output voltage or/and current of the DC-DC conversion circuit can be controlled by adjusting the switching state (e.g., switching frequency or duty cycle) of the switching circuit and/or the DC-DC conversion circuit.

When control of the output voltage or/and current of the DC-DC conversion circuit is completed only by adjusting the switching state of the DC-DC conversion circuit, the switching circuit may be in an open-loop control state. Further, the switching power supply circuit of particular embodiments can be applied in power factor correction (PFC). Further, the power switch in the rectifier module of particular embodiments can be controlled by the primary side or the secondary side independently in the isolated switching power supply circuit. The switching power supply circuit of particular embodiments may directly convert low-frequency AC input signals into high-frequency AC signals, and then can convert the high-frequency AC signals into DC signals to output through the rectifier module. In particular embodiments, a capacitor with a larger capacity can be coupled with the input terminal instead of the input terminal of the switching power supply circuit, which may reduce energy loss, improve the efficiency of the switching power supply circuit, improve the efficiency of the power supply to the post-stage circuit or load by capacitors, reduce the complexity of the system, improve the reliability of the system, reduces the number of power switches in the working path, and reduce the withstand voltage and capacity of the capacitor, thereby reducing the volume of the capacitor and improving the power density of the circuit. Particular embodiments may improve the efficiency of the direct power conversion of the power supply to the post-stage circuit or load.

In addition, the energy storage capacitor can be placed on the input terminal (e.g., primary side) of the switching power supply circuit, which may solve the problem of lower efficiency when the energy storage capacitor is placed on the output terminal (second side) of the switching power supply circuit, thereby achieving simpler control and improved efficiency. In the process of low-frequency AC input voltage supplying power to the post-stage circuit or load, charging the energy storage and discharging the energy storage capacitor to supply power to the post-stage circuit or load, the power switches in the switching circuit may adopt various multiplexing structures, which can reduce the number of power switches and improve the system performance. The low-frequency AC input voltage and the energy storage capacitor of the invention can supply power for the post-stage circuit or load in a full-bridge mode, thereby further improving the efficiency.

Figure 2:
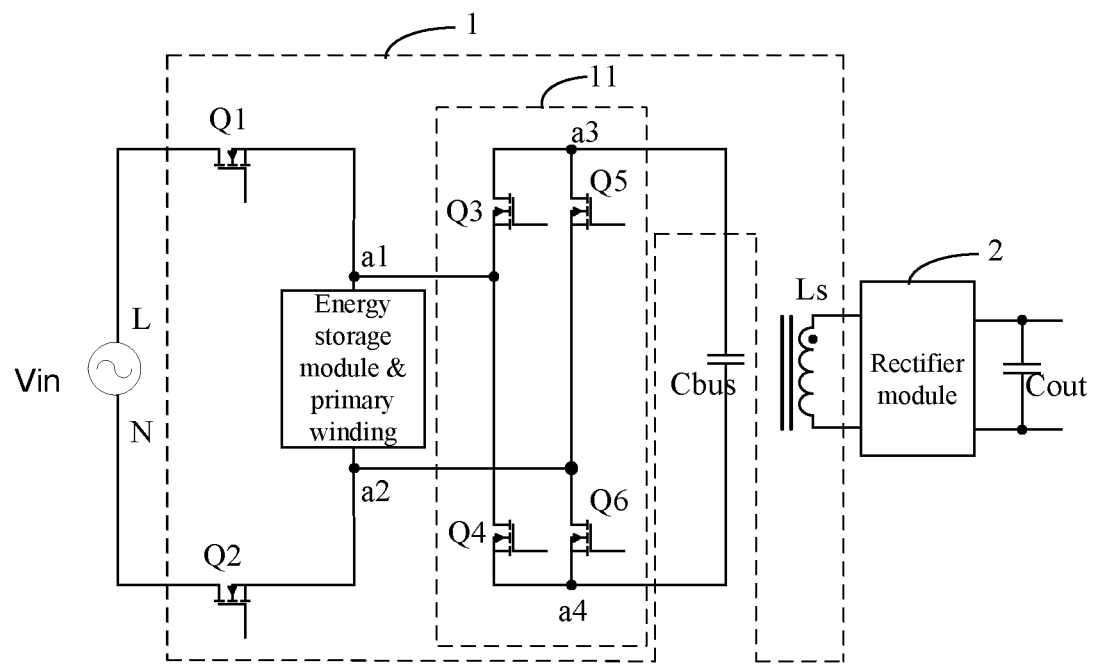
FIG. 2 is a schematic circuit diagram of a first example switching power supply circuit, in accordance with embodiments of the present invention.

Referring now to FIG. 2, shown is a schematic circuit diagram of a first example switching power supply circuit, in accordance with embodiments of the present invention. This particular example switching power supply circuit can include energy storage capacitor Cbus, high-frequency switching network 1 and rectifier module 2. High-frequency switching network 1 can be coupled to energy storage capacitor Cbus, may receive a low-frequency AC input voltage Vin, can charge energy storage capacitor Cbus, and may perform high-frequency chopping on the low-frequency AC input voltage Vin and/or the voltage of energy storage capacitor Cbus to output a high-frequency AC signal. Rectifier module 2 can be coupled to high-frequency switching network 1, may receive the high-frequency AC signal, can rectify the high-frequency AC signal, and may output a DC signal. Rectifier module 2 can be a rectifier circuit, such as a full-wave rectifier circuit and a full-bridge rectifier circuit.

High-frequency switching network 1 can include an energy storage module and a switching circuit. The energy storage module can be charged or discharged by controlling the switching state of the switching circuit, in order to perform high-frequency chopping on the low-frequency AC input voltage Vin and/or the voltage of the energy storage capacitor Cbus. High-frequency switching network 1 can also include a transformer. The energy storage module can be coupled to the primary winding of the transformer, and rectifier module 2 can be coupled to the secondary winding of the transformer. When rectifier module 2 is a full-bridge rectifier circuit, the secondary winding is shown as FIG. 2; that is, the transformer can include secondary winding Ls. The transformer may include two secondary windings when rectifier module 2 is a full-wave rectifier circuit or other rectifier circuit, and the two secondary windings can connect in series, or the transformer can include a secondary winding with a center tap.

The switching circuit can include a low-frequency AC input terminal, power switches Q1 and Q2, and full-bridge circuit 11. Power switches Q1 and Q2, and the low-frequency AC input terminal can connect in series between nodes a1 and a2. The energy storage module and the primary winding can be coupled between nodes a1 and a2, and two ports at a first terminal of full-bridge circuit 11 may respectively be coupled to nodes a1 and a2. A second terminal of full-bridge circuit 11 can be coupled to energy storage capacitor Cbus, and the low frequency AC input terminal can include two ports L and N. Full-bridge circuit 11 can include power switches Q3, Q4, Q5, and Q6. Power switches Q3 and Q4 can sequentially be connected in series between nodes a3 and a4. Power switches Q5 and Q6 can connect in series between nodes a3 and a4. Two ports at a first terminal of full-bridge circuit may respectively be connected to the common node of power switches Q3 and Q4, and the common node of power switches Q5 and Q6. The common node of power switches Q3 and Q4 can be coupled to node a1, and the common node of power switches Q5 and Q6 can be coupled to node a2. Energy storage capacitor Cbus is coupled between nodes a3 and a4. The energy storage module can include at least one inductor and/or at least one capacitor to form different topological structures from the switching circuit. The difference in the number of inductors and/or capacitors and the connection modes may lead to different topological structures.

Figure 3:
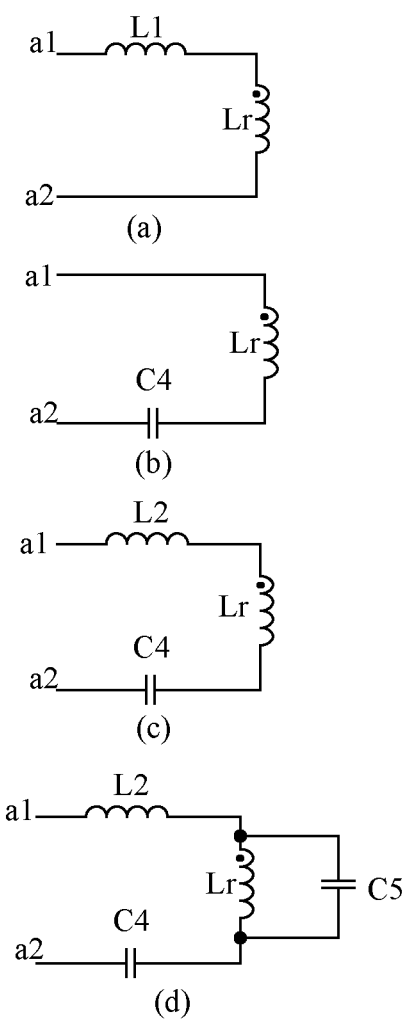
FIG. 3 is a schematic diagram of example energy storage module and primary winding in the first example switching power supply, in accordance with embodiments of the present invention.

Referring now to FIG. 3, shown is a schematic diagram of example energy storage module and primary winding in the first example switching power supply, in accordance with the embodiments of the present invention. In this particular example, four types of energy storage modules and primary windings are shown. As shown in (a) of FIG. 3, the energy storage module can include inductor L1, where inductor L1 and primary winding Lr of the transformer can connect in series between nodes a1 and a2. As shown in (b) of FIG. 3, the energy storage module can include capacitor C4, where capacitor C4 and primary winding Lr of the transformer can connect in series between nodes a1 and a2. As shown in (c) of FIG. 3, the energy storage module can include capacitor C4 and inductor L2. Inductor L2, capacitor C4, and primary winding Lr can connect in series between nodes a1 and a2. As shown in (d) of FIG. 3, the energy storage module can include capacitor C4, inductor L2, and capacitor C5. Inductor L2, capacitor C4, and primary winding Lr can connect in series between nodes a1 and a2, and capacitor C5 and primary winding Lr can connect in parallel. In other embodiments, the energy storage module can also be in other combinations of inductor and capacitor. In this embodiment, the switching power supply circuit can also include capacitor Cout that can connect to the output terminal of rectifier module 2. Capacitor Cout can be a capacitor with a smaller capacity, and may be used for filtering the output signal of rectifier module 2.

In this embodiment, the switching power supply circuit can operate in the following four operating modes as discussed below. In the first operating mode, low-frequency AC input voltage Vin may supply power to the post-stage circuit or load in a half-bridge state. In the positive half cycle of the low-frequency AC input voltage Vin (e.g., the voltage at port L is greater than that at port N), power switches Q3 and Q5 can be turned off, and power switch Q2 and power switch Q6 may be on. Also, power switches Q1 and Q4 can be turned on alternately in a high-frequency PWM manner to perform high-frequency chopping on low-frequency AC input voltage Vin to generate high-frequency AC signal. For example, when power switch Q1 is turned on and power switch Q4 is turned off, low-frequency AC input voltage Vin can charge the energy storage module and the primary winding, and may provide power for the post-stage circuit or the load, and low-frequency AC input voltage Vin can charge energy storage capacitor Cbus through the body diode of power switches Q3 and Q6 in the full-bridge circuit 11. If power switch Q3 has no body diode, power switch Q3 may be turned on to charge energy storage capacitor Cbus. When power switch Q4 is turned on and power switch Q1 is turned off, the energy storage module and the primary winding can be discharged through power switches Q4 and Q6 to supply power to the post-stage circuit or load. In this process, if the energy storage module includes a capacitor, high-frequency switching network 1 may operate in a half-bridge resonance state to perform high-frequency chopping on the low-frequency AC input voltage Vin. If the frequency of the switching circuit may not reach the resonance frequency, high-frequency switching network 1 may operate in a half-bridge converter state to perform high-frequency chopping on the low-frequency AC input voltage Vin. The specific type of the half-bridge converter can be related to the composition and connection mode of the energy storage module. If the energy storage module only includes an inductor, high-frequency switching network 1 may operate in a half-bridge buck state to perform high-frequency chopping on the low-frequency AC input voltage Vin.

In the negative half cycle of the low-frequency AC input voltage Vin (e.g., the voltage at port L is less than that at port N), power switches Q4 and Q6 can be turned off, and power switches Q1 and Q5 may be turned on. Power switches Q2 and Q3 can be turned on alternately in a high-frequency PWM manner to perform high-frequency chopping on the low-frequency AC input voltage Vin to generate high-frequency AC signal. For example, when power switch Q2 is turned on and power switch Q3 is turned off, low-frequency AC input voltage Vin can charge the energy storage module and the primary winding, and may provide power for the post-stage circuit or load. In addition, low-frequency AC input voltage Vin can charge energy storage capacitor Cbus through the body diode of power switches Q4 and Q5 in full-bridge circuit 11. If power switch Q4 has no body diode, power switch Q4 may be turned on to charge energy storage capacitor Cbus.

When power switch Q3 is turned on and power switch Q2 is turned off, the energy storage module and the primary winding can be discharged through power switches Q3 and Q5 to supply power to the post-stage circuit or load. In this process, if the energy storage module includes a capacitor, the high-frequency switching network 1 may operate in a half-bridge resonance state to perform high-frequency chopping on the low-frequency AC input voltage Vin. If the frequency of the switching circuit may not reach the resonance frequency, high-frequency switching network 1 may operate in a half-bridge converter state to perform high-frequency chopping on the low-frequency AC input voltage Vin. The specific type of the half-bridge converter may be related to the composition and connection mode of the energy storage module. If the energy storage module only includes an inductor, the high-frequency switching network 1 may operate in a half-bridge buck state to perform high-frequency chopping on the low-frequency AC input voltage Vin. In addition, six power switches in the switching circuit can operate in the above-mentioned manner, in this particular example. The switches can be controlled to operate in other ways, and the low-frequency AC input voltage Vin can also operate in the half-bridge state to supply power to the post-stage circuit or load.

In the second operating mode, low-frequency AC input voltage Vin and energy storage capacitor Cbus may supply power to the post-stage circuit or load in a full-bridge state. In the positive half cycle of the low-frequency AC input voltage Vin (e.g., the voltage at port L is greater than that at port N), power switches Q1, Q2, Q4, and Q5 can be turned on alternately in a high-frequency PWM manner (e.g., power switches Q1 and Q2 are turned on). In addition, power switches Q4 and Q5 can be turned on, and power switches Q1 and Q4 can be turned on alternately in a high-frequency PWM mode to perform high-frequency chopping on low-frequency AC input voltage Vin and the voltage of energy storage capacitor Cbus, and to generate high frequency AC signal. For example, when power switches Q1 and Q2 are simultaneously turned on, low-frequency AC input voltage Vin may supply power to the post-stage circuit or load. In addition, low-frequency AC input voltage Vin can charge energy storage capacitor Cbus through the body diodes of power switches Q3 and Q6 in the full-bridge circuit 11. If power switches Q3 and Q6 have no body diodes, power switches Q3 and Q6 can be turned on to charge the energy storage capacitor Cbus.

When power switches Q4 and Q5 are turned on, storage capacitor Cbus may supply power to the post-stage circuit or load. In this process, if the energy storage module includes a capacitor, high-frequency switching network 1 may operate in a full-bridge resonance state to perform high frequency on the low-frequency AC input voltage Vin and the voltage of the energy storage capacitor Cbus alternately. If the switching frequency of the switching circuit may not reach the resonant frequency, high-frequency switching network 1 may operate in a full-bridge converter state to perform high frequency on the low-frequency AC input voltage Vin and the voltage of the energy storage capacitor Cbus alternately. The specific type of the full-bridge converter can be related to the composition and connection mode of the energy storage module. If the energy storage module only includes an inductor, high-frequency switching network 1 may operate in a full-bridge buck state to alternately perform high-frequency chopping on low-frequency AC input voltage Vin and the voltage of energy storage capacitor Cbus.

In the negative half cycle of the low-frequency AC input voltage Vin (e.g., the voltage at port L is less than that at port N), power switches Q1, Q2, Q3, and Q6 can be turned on in a high-frequency PWM mode, in order to perform high-frequency chopping on the low-frequency AC input voltage Vin and the voltage of the energy storage capacitor Cbus and generate a high-frequency AC signal. For example, when power switches Q1 and Q2 are turned on, low-frequency AC input voltage Vin supplies power to the post-stage circuit or load, In addition, low-frequency AC input voltage Vin can charge energy storage capacitor Cbus through the body diodes of power switches Q4 and Q5 in full-bridge circuit 11. If power switches Q4 and Q5 have no body diodes, power switches Q4 and Q5 can be turned on to charge energy storage capacitor Cbus. When power switches Q3 and Q6 are turned on, storage capacitor Cbus may supply power to the post-stage circuit or load. In this process, if the energy storage module includes a capacitor, high-frequency switching network 1 may operate in a full-bridge resonance state to alternately perform high frequency on low-frequency AC input voltage Vin and the voltage of energy storage capacitor Cbus.

If the switching frequency of the switching circuit may not reach the resonant frequency, high-frequency switching network 1 may operate in a full-bridge converter state to alternately perform high-frequency chopping on low-frequency AC input voltage Vin and energy storage capacitor Cbus, and the specific type of the full-bridge converter can be related to the composition and connection mode of the energy storage module. If the energy storage module only includes an inductor, high-frequency switching network 1 may operate in a full-bridge buck state to alternately perform high-frequency chopping on low-frequency AC input voltage Vin and the voltage of energy storage capacitor Cbus. In this mode, low-frequency AC input voltage Vin and energy storage capacitor Cbus can supply power to the post-stage circuit or load in a full-bridge state to further improve the efficiency of the switching power supply circuit. The six power switches in the switching circuit may operate in the above-mentioned manner, in this particular example. The six power switches in the switching circuit can be controlled to operate in other ways, and low-frequency AC input voltage Vin and energy storage capacitor Cbus can also be controlled to supply power to the post-stage circuit or load in a full-bridge state.

In the third operating mode, energy storage capacitor Cbus may supply power to the post-stage circuit or load in a full-bridge state. Power switches Q3, Q4, Q5, and Q6 can be turned on in a high-frequency PWM manner, in order to perform high-frequency chopping on the voltage of energy storage capacitor Cbus and to generate high-frequency AC signals. For example, when power switches Q3 and Q6 are simultaneously turned on, energy storage capacitor Cbus may supply power to the post-stage circuit or load. When power switches Q4 and Q5 are turned on, energy storage capacitor Cbus may supply power to the post-stage circuit or load. In this process, if the energy storage module includes a capacitor, high-frequency switching network 1 may operate in a full-bridge resonance state to perform high-frequency chopping on the voltage of energy storage capacitor Cbus. If the switching frequency cannot reach the resonance frequency, high-frequency switching network 1 may operate in a full-bridge converter state to perform high-frequency chopping on the voltage of the energy storage capacitor Cbus. The specific type of the full-bridge converter can be related to the composition and connection mode of the energy storage module. If the energy storage module only includes an inductor, high-frequency switching network 1 may operate in a full-bridge buck state to perform high-frequency chopping on the voltage of energy storage capacitor Cbus. In this mode, energy storage capacitor Cbus may supply power to the post-stage circuit or load in a full-bridge state, which can further improve the efficiency of the switching power supply circuit.

In the fourth operating mode, energy storage capacitor Cbus may supply power to the post-stage circuit or load in a half-bridge state. Power switch Q6 may be turned on, and power switches Q3 and Q4 can be turned on alternately in a high-frequency PWM manner to perform high-frequency chopping on the voltage of energy storage capacitor Cbus, and to generate high frequency AC signal. For example, when power switch Q3 is turned on and power switch Q4 is turned off, energy storage capacitor Cbus can charge the energy storage module and the primary winding, and may provide power for the post-stage circuit or the load. When power switch Q4 is turned on and power switch Q3 is turned off, the energy storage module and the primary winding can be discharged to supply power to the post-stage circuit or load. In this process, if the energy storage module includes a capacitor, high-frequency switching network 1 may operate in a half-bridge resonance state to perform high-frequency chopping on the voltage of energy storage capacitor Cbus. If the switching frequency may not reach the resonant frequency, high-frequency switching network 1 may operate in a half-bridge converter state to perform high-frequency chopping on the voltage of energy storage capacitor Cbus. The specific type of the full-bridge converter may be related to the composition and connection mode of the energy storage module. If the energy storage module only includes an inductor, high-frequency switching network 1 may operate in a half-bridge buck state to perform high-frequency chopping on the voltage of energy storage capacitor Cbus.

In addition, the six power switches in the switching circuit may operate in the above-mentioned manner, in this particular example. The six power switches in the switching circuit can be controlled to operate in other ways, such as controlling power switch Q3 to be turned on at all times, controlling power switches Q5 and Q6 to be turned on alternately in a high-frequency PWM manner, and energy storage capacitor Cbus can also be used to supply power to the post-stage circuit or load in a half-bridge state. It should be noted that complementary conduction is a special example of being turned on alternately, as discussed above. When complementary conduction is used, the efficiency is the highest. However, in order to prevent instantaneous short-circuit phenomenon caused by the turn-off delay of the power switch, a dead time can be inserted in the middle of the state switching of the two groups of power switches with complementary conduction. In this embodiment, when the switching power supply circuit supplies power to the post-stage circuit or load, the above four operating modes can performed individually or in any suitable combination. In this embodiment, high-frequency switching network 1 may only operate for a period of time in the cycle of low-frequency AC input voltage Vin, such that rectifier module 2 generates a pulsating current.

Figure 4:
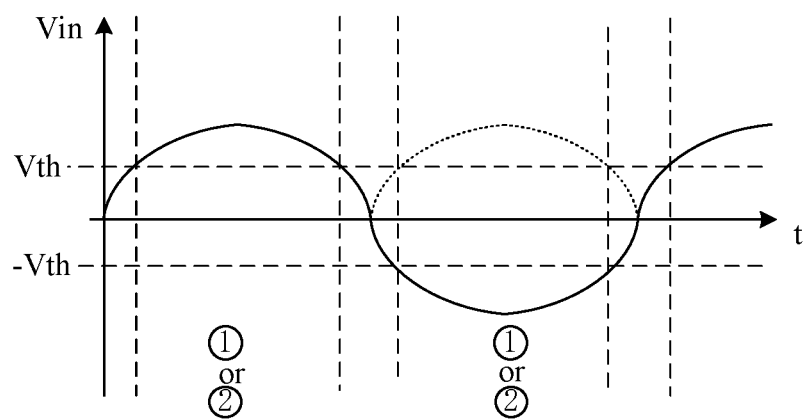
FIG. 4 is a waveform diagram of example operation of the switching power supply circuit, in accordance with embodiments of the present invention.

Referring now to FIG. 4, shown is a waveform diagram of example operation of the switching power supply circuit, in accordance with embodiments of the present invention. In this example, an operating process is shown for the switching power supply circuit to supply power to the post-stage circuit or load, where Vin is the low-frequency AC input voltage, Vbus is the voltage of energy storage capacitor Cbus, Vth is the "first" voltage threshold, ① is a first operating mode, and ② is a second operating mode. As shown, when the absolute value of low-frequency AC input voltage Vin is greater than voltage threshold Vth, the switching power supply circuit may operate in the above-mentioned first operating mode or the second operating mode. That is, there is a mode in which low-frequency AC input voltage Vin supplies power to the post-stage circuit or the load, and when the absolute value of low-frequency AC input voltage Vin is less than voltage threshold Vth, the switching power supply circuit may not operate, such that rectifier module 2 can generate a pulsating current. Further, high-frequency switching network 1 can operate in the entire cycle of low-frequency AC input voltage Vin, such that the rectifier module generates a continuous current.

Figure 5:
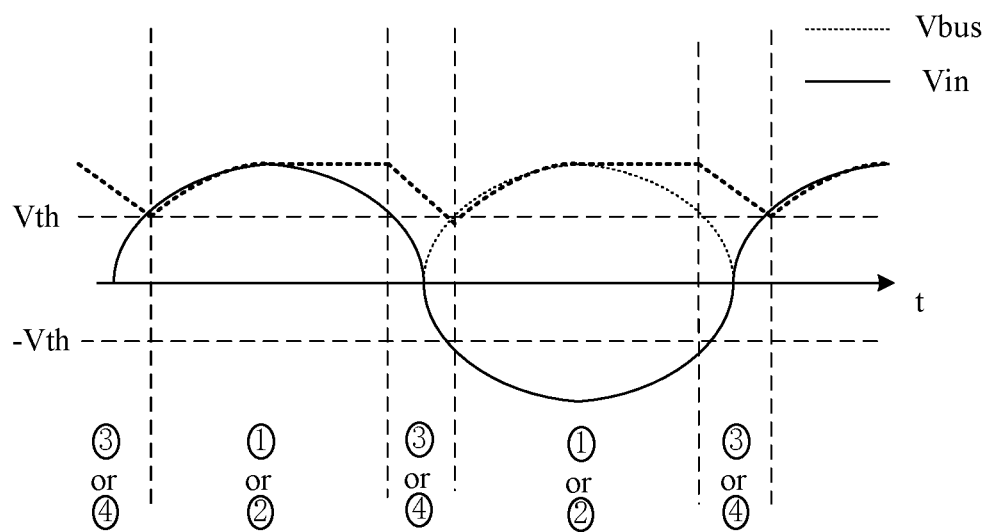
FIG. 5 is a waveform diagram of another example operation of the switching power supply circuit, in accordance with embodiments of the present invention.

Referring now to FIG. 5, shown is a waveform diagram of another example operation of the switching power supply circuit, in accordance with embodiments of the present invention. In this example, an operating process is shown for the switching power supply circuit to supply power to the post-stage circuit or load, where Vin is the low-frequency AC input voltage, Vbus is the voltage of energy storage capacitor Cbus, Vth is a first voltage threshold, ① is a first operating mode, ② is a second operating mode, ③ is a third operating mode, and ④ is a fourth operating mode. As shown, when the absolute value of low-frequency AC input voltage Vin is greater than voltage threshold Vth, the switching power supply circuit may operate in the first or second operating mode. That is, there is at least a mode in which low-frequency AC input voltage Vin supplies power to the post-stage circuit or load, and charges energy storage capacitor Cbus at the same time. When the absolute value of low-frequency AC input voltage Vin is less than voltage threshold Vth, the switching power supply circuit may operate in the third or fourth operating mode, e.g., the mode in which energy storage capacitor Cbus is discharged to supply power to the post-stage circuit or load.

Figure 6:
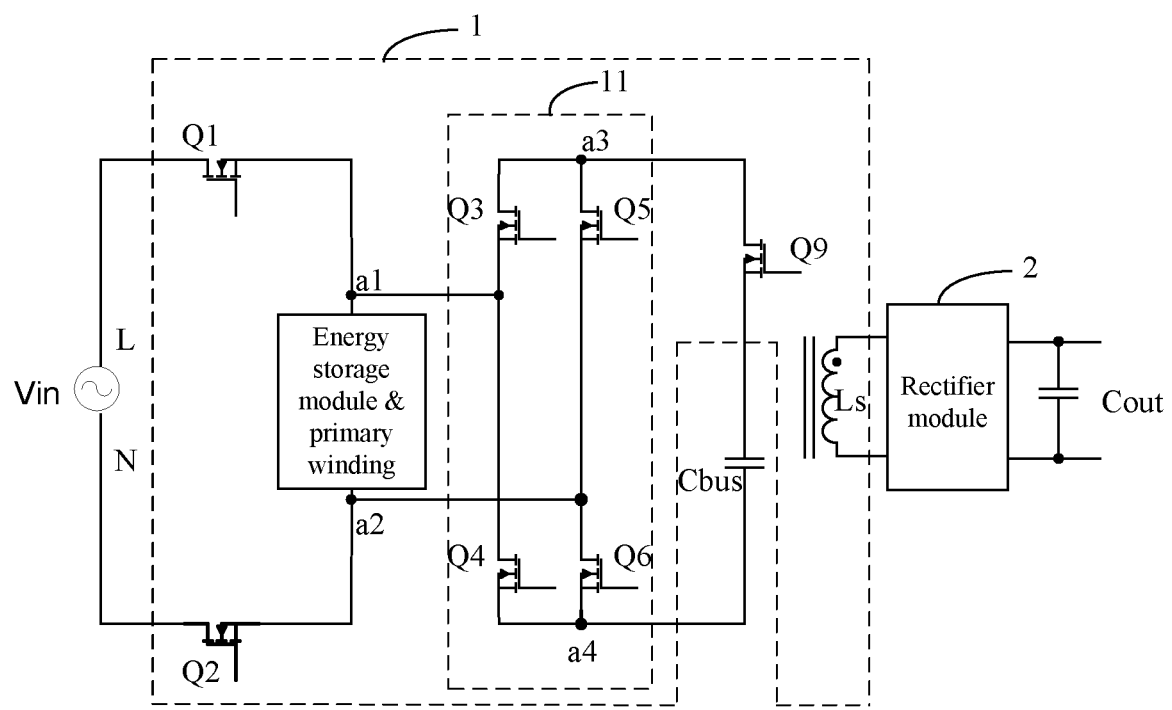
FIG. 6 is a schematic circuit diagram of a second example switching power supply circuit, in accordance with embodiments of the present invention.

Referring now to FIG. 6, shown is a schematic circuit diagram of a second example switching power supply circuit of the present invention. In this particular example, power switch Q9 can be included, and power switch Q9 and energy storage capacitor Cbus can connect in series between nodes a3 and a4. Power switch Q9 can limit the forward voltage of energy storage capacitor Cbus. That is, when the voltage of energy storage capacitor Cbus is greater than a certain threshold, power switch Q9 can be turned off. In this embodiment, the configuration of the energy storage module, the rectifier module, and the transformer of the switching power supply circuit are substantially similar to those in the first embodiment. In addition, the switching power supply circuit can operate in the first, third, and fourth operating mode as described in the first embodiment, and the above three operating modes in this embodiment are substantially similar to those in the first embodiment. Further, when the switching power supply circuit supplies power to the post-stage circuit or load, the above three operating modes can be performed individually or in any suitable combination.

Figure 7:
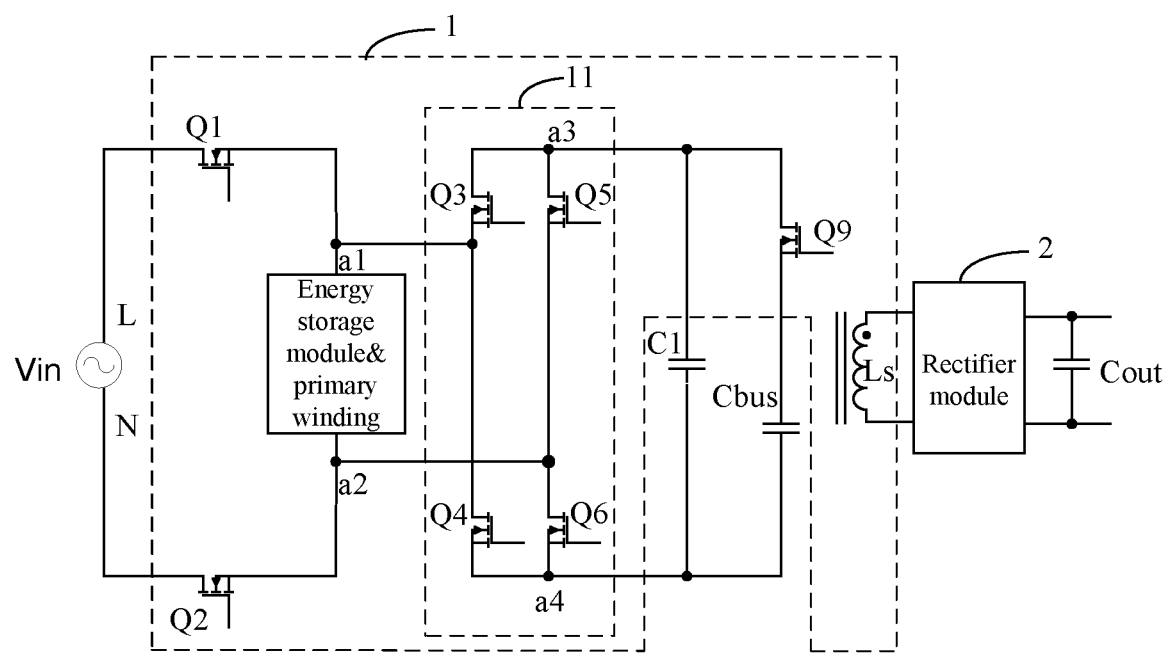
FIG. 7 is a schematic circuit diagram of a third example switching power supply circuit, in accordance with embodiments of the present invention.

Referring now to FIG. 7, shown is a schematic circuit diagram of a third example switching power supply circuit in accordance with the embodiments of the present invention. In this particular example, the switching power supply circuit can include capacitor C1, and capacitor C1 can be coupled between third nodes a3 and node a4. In this embodiment, the switching circuit, energy storage module, rectifier module, and transformer of the switching power supply circuit are substantially similar to those in the second embodiment. Also, the switching power supply circuit can operate in the first, second, third, and fourth operating mode as described in the first embodiment. The first specific operating modes of the first, third, and fourth operating modes are substantially similar to those in the first embodiment.

Moreover, capacitor C1 can be included in this embodiment, and capacitor C1 is a small high-voltage capacitor. In this embodiment, the switching power supply circuit may operate in the second operating mode, as described in the first embodiment. Low-frequency AC input voltage Vin and capacitor C1 can be used to supply power to the post-stage circuit or load in a full-bridge state alternately. That is, when the switching power supply circuit operates in the second operating mode, capacitor C1 can replace energy storage capacitor Cbus when the switching power supply circuit in the first embodiment operates in the second operating mode, and remaining portions of the operating mode are substantially similar to that in the first embodiment. In this embodiment, when the switching power supply circuit supplies power to the post-stage circuit or load, the above four operating modes can be performed individually or in any suitable combination.

Figure 8:
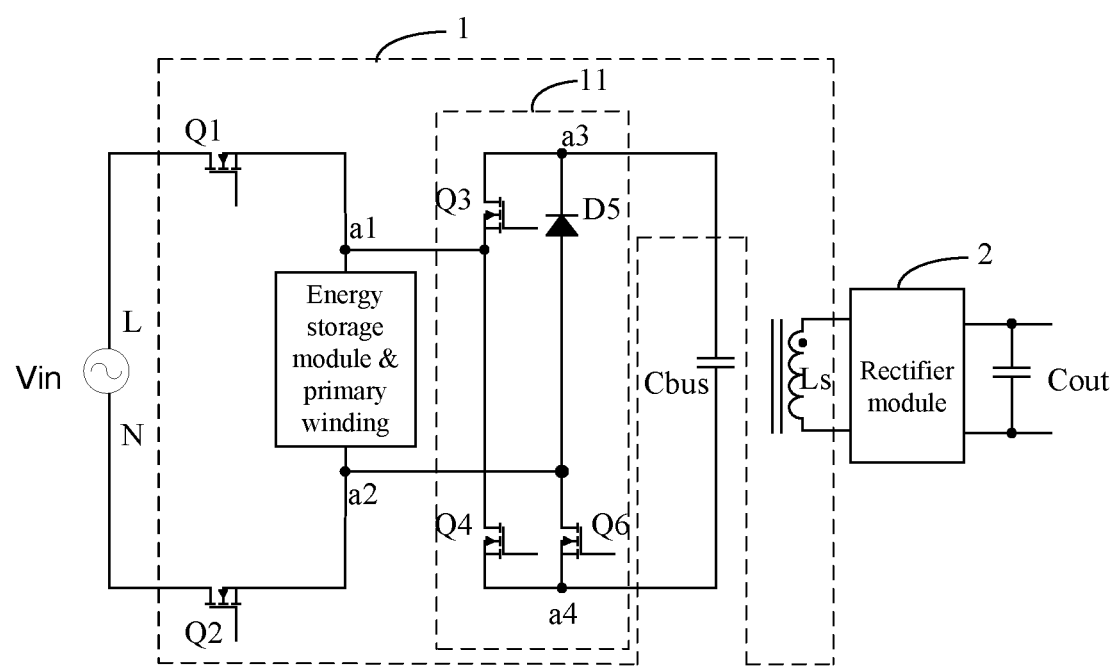
FIG. 8 is a schematic circuit diagram of a fourth example switching power supply circuit, in accordance with embodiments of the present invention.

Referring now to FIG. 8, shown is a schematic circuit diagram of a fourth example switching power supply circuit, in accordance with embodiments of the present invention. In this particular example, power switch Q5 is replaced with diode D5, which can reduce the control of one power switch, and remaining portions are substantially the same as those in the first embodiment. In this embodiment, the switching power supply circuit can operate in the first, second, third, and fourth operating mode, as described in the first embodiment. In this embodiment, the specific operation way of the above four operating modes is substantially similar to that in the first embodiment. In this embodiment, when the switching power supply circuit supplies power to the post-stage circuit or load, the above four operating modes can be performed individually or in any suitable combination.

Figure 9:
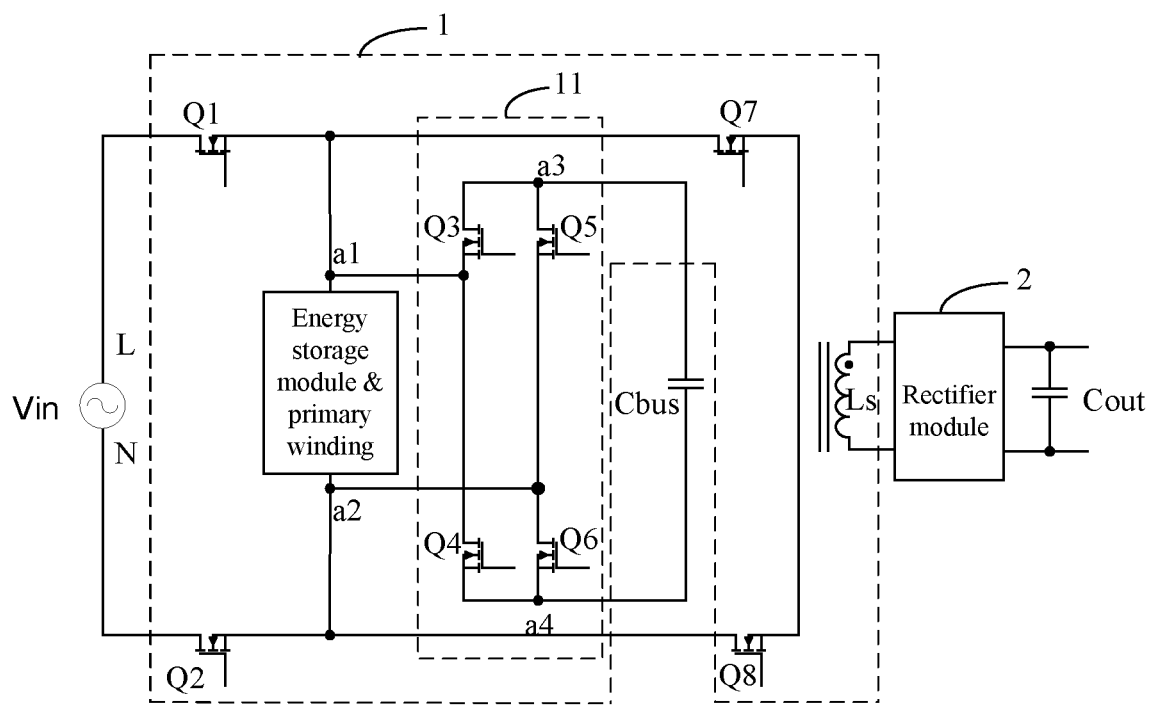
FIG. 9 is a schematic circuit diagram of a fifth example switching power supply circuit, in accordance with embodiments of the present invention.

Referring now to FIG. 9, shown is a schematic circuit diagram of a fifth example switching power supply circuit, in accordance with embodiments of the present invention. In this particular example, the switching circuit can include power switches Q7 and Q8, and power switches Q7 and Q8 can connect in series between nodes a1 and a2. In this embodiment, the configurations of the energy storage module, the rectifier module, and the transformer of the switching power supply circuit are substantially similar to those in the first embodiment. In this embodiment, the switching power supply circuit can operate in the first, second, third, and fourth operating mode as described in the first embodiment, and the specific operation way of the above four operating modes in this embodiment are similar to that in the first embodiment.

The switching power supply circuit in this embodiment can also operate in a fifth operating mode. In the fifth operating mode, the power supply may not supply power to the post-stage circuit or the load through full-bridge circuit 11. For example, during the positive half cycle of low-frequency AC input voltage Vin (e.g., the voltage at port L is greater than the voltage at port N), power switches Q2 and Q8 can be turned on. Also, power switches Q1 and Q7 can be turned on alternately in a high-frequency PWM mode to perform high-frequency chopping on low-frequency AC input voltage Vin, and to generate a high-frequency AC signal. For example, when power switch Q1 is turned on and power switch Q7 is turned off, low-frequency AC input voltage Vin can charge the energy storage module and the primary winding, and may provide power for the post-stage circuit or load. Also, low-frequency AC input voltage Vin can charge energy storage capacitor Cbus through the body diodes of power switches Q3 and Q6 in full-bridge circuit 11 at the same time. If power switches Q3 and Q6 have no body diodes, power switches Q3 and Q6 can be turned on to charge energy storage capacitor Cbus.

When power switch Q7 is turned on and power switch Q1 is turned off, the energy storage module and the primary winding can be discharged to supply power to the post-stage circuit or load through power switches Q7 and Q8. In this process, if the energy storage module includes a capacitor, high-frequency switching network 1 may operate in a half-bridge resonance state to perform high-frequency chopping on low-frequency AC input voltage Vin. If the frequency of the switching circuit cannot reach the resonance frequency, high-frequency switching network 1 may operate in a half-bridge converter state to perform high-frequency chopping on low-frequency AC input voltage Vin. The specific type of the half-bridge converter can be related to the composition and connection mode of the energy storage module. If the energy storage module only includes an inductor, high-frequency switching network 1 may operate in a half-bridge buck state to perform high-frequency chopping on low-frequency AC input voltage Vin.

In the negative half cycle of low-frequency AC input voltage Vin (e.g., the voltage at port L is less than the voltage at port N), power switches Q1 and Q7 can be turned on, and power switches Q2 and Q8 can be turned on alternately in a high-frequency PWM mode to perform high-frequency chopping on low-frequency AC input voltage Vin to generate a high-frequency AC signal. For example, when power switch Q2 is turned on and power switch Q8 is turned off, low-frequency AC input voltage Vin can charge the energy storage module and the primary winding, and may provide power for the post-stage circuit or load. In addition, low-frequency AC input voltage Vin can charge energy storage capacitor Cbus through the body diodes of power switches Q4 and Q5 in full-bridge circuit 11. If power switches Q4 and Q5 have no body diodes, power switches Q4 and Q5 can be turned on to charge energy storage capacitor Cbus.

When power switch Q8 is turned on and power switch Q2 is turned off, the energy storage module and the primary winding can be discharged to supply power to post-stage circuit or load through power switches Q7 and Q8. In this process, if the energy storage module includes a capacitor, high-frequency switching network 1 may operate in a half-bridge resonance state to perform high-frequency chopping on low-frequency AC input voltage Vin. If the frequency of the switching circuit cannot reach the resonance frequency, high-frequency switching network 1 may operate in a half-bridge converter state to perform high-frequency chopping on low-frequency AC input voltage Vin. The specific type of the half-bridge converter can be related to the composition and connection mode of the energy storage module. If the energy storage module only includes an inductor, high-frequency switching network 1 may operate in a half-bridge buck state to perform high-frequency chopping on low-frequency AC input voltage Vin.

In this embodiment, when the switching power supply circuit supplies power to the post-stage circuit or the load, the above five operating modes can be performed individually or in any suitable combination. Further, high-frequency switching network 1 may only operate for a period of time in the cycle of low-frequency AC input voltage Vin, such that rectifier module 2 can generate current in the form of pulsation. For example, when the absolute value of low-frequency AC input voltage Vin is greater than voltage threshold Vth, the switching power supply circuit may operate in the first, second, or fifth operating mode. That is, there is a mode in which low-frequency AC input voltage Vin may supply power to the post-stage circuit or load. When the absolute value of low-frequency AC input voltage Vin is less than voltage threshold Vth, the switching power supply circuit may not operate, such that rectifier module 2 generates a pulsating current. In this embodiment, high-frequency switching network 1 can operate in the entire cycle of the low-frequency AC input voltage Vin, such that the rectifier module may generate a continuous current. For example, when the absolute value of the low-frequency AC input voltage Vin is greater than voltage threshold Vth, the switching power supply circuit can operate in the first, second, or fifth operating mode. That is, there is a mode whereby low-frequency AC input voltage Vin supplies power to the post-stage circuit or load, and charges energy storage capacitor Cbus. When the absolute value of the low-frequency AC input voltage Vin is less than voltage threshold Vth, the switching power supply circuit may operate in the third or fourth operating mode. That is, the mode in which the energy storage capacitor Cbus can discharge to supply power to the post-stage circuit or load.

Figure 10:
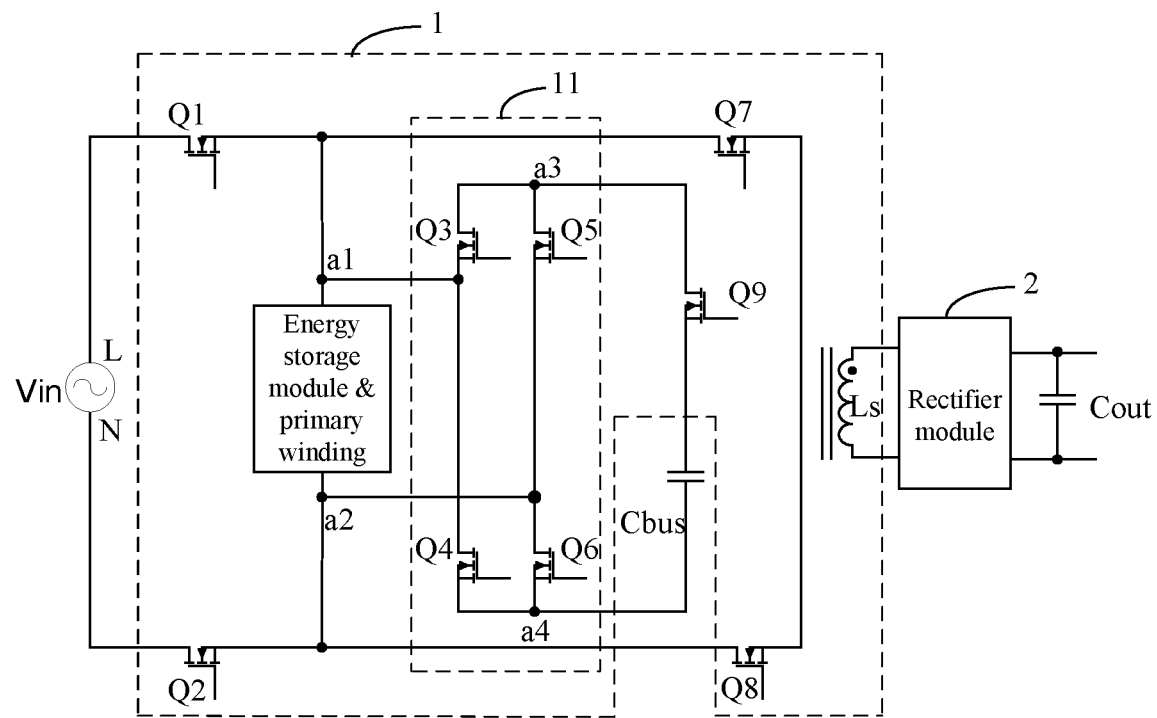
FIG. 10 is a schematic circuit diagram of a sixth example switching power supply circuit, in accordance with embodiments of the present invention.

Referring now to FIG. 10, shown is a schematic circuit diagram of a sixth example switching power supply circuit, in accordance with embodiments of the present invention. In this particular example, the switching power supply circuit can include power switch Q9, and power switch Q9 and energy storage capacitor Cbus can connect in series between nodes a3 and a4. Power switch Q9 may limit the forward voltage of energy storage capacitor Cbus. That is, when the voltage of energy storage capacitor Cbus is greater than a certain threshold, power switch Q9 can be turned off. In this embodiment, the configurations of the energy storage module, rectifier module, and transformer of the switching power supply circuit can be substantially similar to those in the fifth embodiment. Further, the switching power supply circuit can operate in the first, third, fourth, and fifth operating modes, as described in the fifth embodiment, and the specific working methods of the above four operating modes in this embodiment are substantially similar to those in the fifth embodiment. In this embodiment, when the switching power supply circuit supplies power to the post-stage circuit or the load, the above four operating modes can be performed individually or in any suitable combination.

Figure 11:
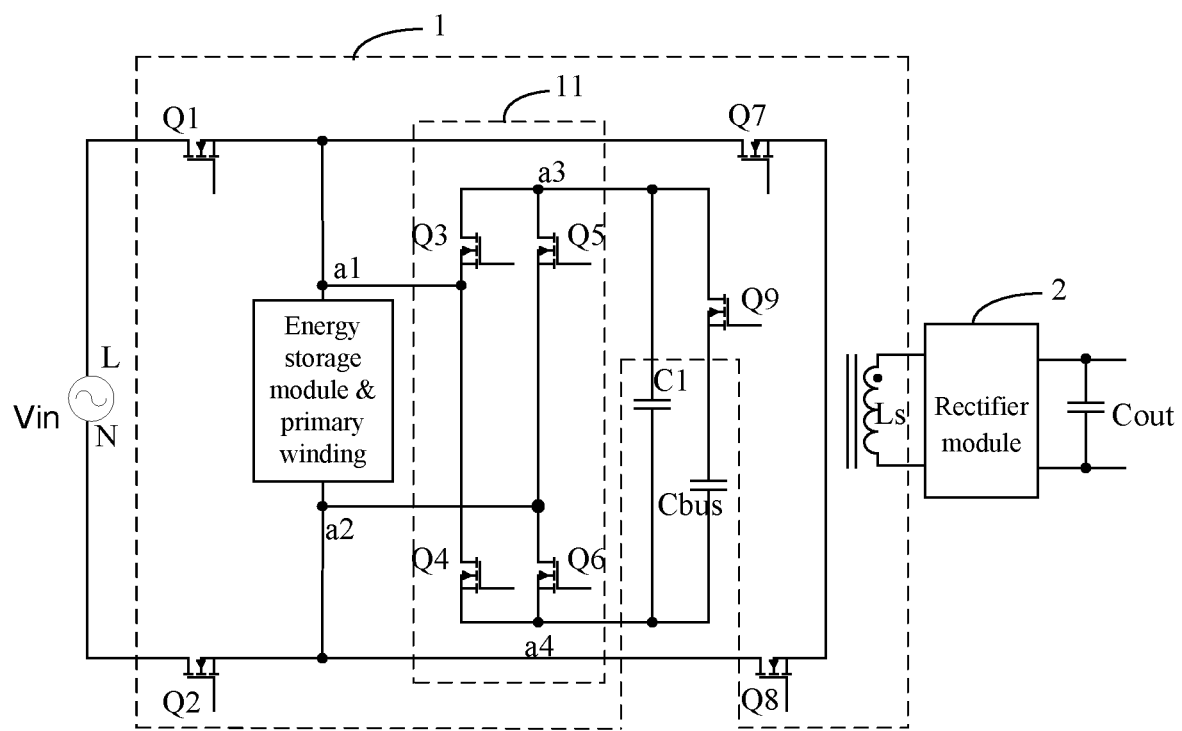
FIG. 11 is a schematic circuit diagram of a seventh example switching power supply circuit, in accordance with embodiments of the present invention.

Referring now to FIG. 11, shown is a schematic circuit diagram of a seventh example switching power supply circuit, in accordance with embodiments of the present invention. In this particular example, the switching power supply circuit in this embodiment can include capacitor C1, and capacitor C1 may be coupled between third nodes a3 and node a4. In this embodiment, the switching circuit, energy storage module, rectifier module, and transformer of the switching power supply circuit can be substantially similar to those in the fifth embodiment. In this embodiment, capacitor C1 is a high-voltage small capacitor. When the switching power supply circuit operates in the second operating mode as described in the fifth embodiment, low-frequency AC input voltage Vin and capacitor C1 can supply power to the post-stage circuit or load in a full-bridge state. That is, when the switching power supply circuit operates in the second operating mode, capacitor C1 may replace energy storage capacitor Cbus when the switching power supply circuit of the fifth embodiment operates in the second operating mode, and remaining portions of the operating modes are substantially similar to those in the first embodiment. In this embodiment, when the switching power supply circuit supplies power to the post-stage circuit or the load, the above-mentioned five operating modes can operate individually or in any suitable combination.

Figure 12:
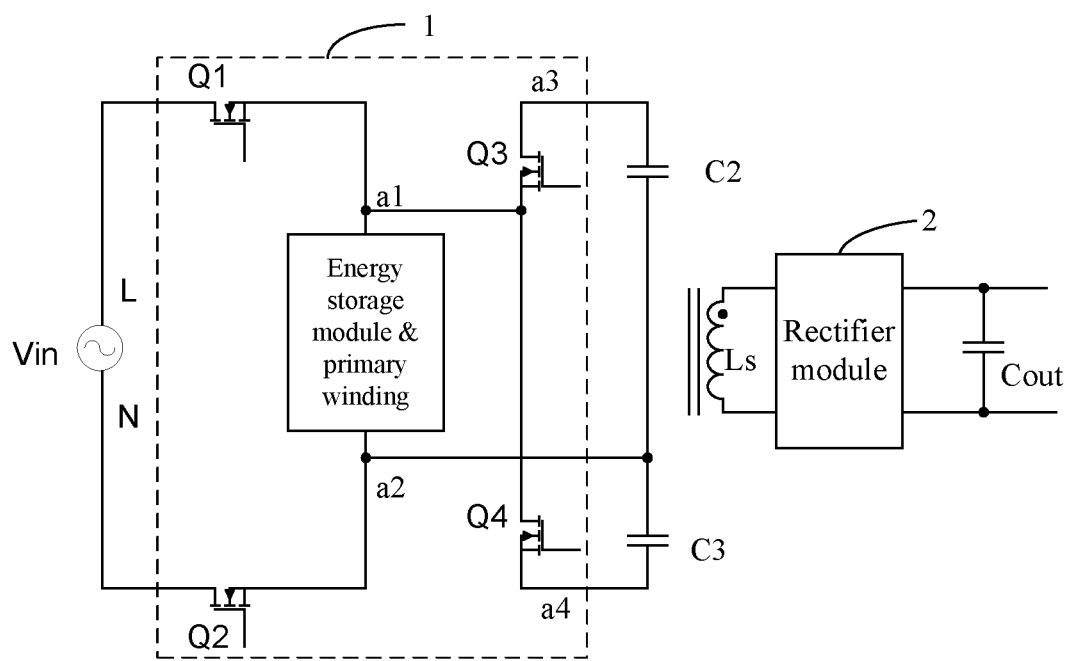
FIG. 12 is a schematic circuit diagram of an eighth example switching power supply circuit, in accordance with embodiments of the present invention.

Referring now to FIG. 12, shown is a circuit diagram of an eighth example switching power supply circuit, in accordance with embodiments of the present invention. The switching power supply circuit can include an energy storage capacitor, high-frequency switching network 1, and rectifier module 2. High-frequency switching network 1 can be coupled to the energy storage capacitor, may receive low frequency AC input voltage Vin, can charge the energy storage capacitor, may perform high frequency chopping on low frequency AC input voltage Vin and/or the voltage of the energy storage capacitor, and can generate a high frequency AC signal. Rectifier module 2 can be coupled to high-frequency switching network 1, may receive the high-frequency AC signal, can rectify the high-frequency AC signal, and may generate a DC signal. The energy storage capacitor can include capacitors C2 and C3. High-frequency switching network 1 can include an energy storage module, a switching circuit, and a transformer, and the switching circuit can include a low-frequency AC input terminal, and power switches Q1, Q2, Q3, and Q4.

Power switches Q1 and Q2 and the low-frequency AC input terminal can connect in series between nodes a1 and a2, the energy storage module and the primary winding of the transformer can be coupled between nodes a1 and a2, power switches Q3 and Q4 can connect in series between nodes a3 and a4, and capacitors C2 and C3 can connect in series between nodes a3 and a4. The common node of power switches Q3 and Q4 and the common node of capacitors C2 and C3 can be respectively coupled to nodes a1 and a2, and the low-frequency AC input terminal can include two ports L, N. In this embodiment, the configurations of the energy storage module, the rectifier module, and the transformer of the switching power supply circuit are substantially similar to those in the first embodiment. In this embodiment, the switching power supply circuit can operate in the following two operating modes.

In the first operating mode, low-frequency AC input voltage Vin can supply power to the post-stage circuit or load in a half-bridge state. In the positive half cycle of low-frequency AC input voltage Vin (e.g., the voltage at port L is greater than the voltage at port N), power switch Q2 can be turned on, and power switches Q1 and Q4 can be turned on alternately in the high-frequency PWM mode to perform high-frequency chopping on low-frequency AC input voltage Vin to generate a high-frequency AC signal. For example, when power switch Q1 is turned on and power switch Q4 is turned off, low-frequency AC input voltage Vin can charge the energy storage module and the primary winding, and may provide power for the post-stage circuit or load. In addition, the low-frequency AC input voltage Vin can charge capacitor C2 through the body diode of power switch Q3. If power switch Q3 has no body diode, power switch Q3 may be turned on to charge capacitor C2.

When power switch Q4 is turned on and power switch Q1 is turned off, the energy storage module and the primary winding can be discharged to supply power to the post-stage circuit or load. In this process, if the energy storage module includes a capacitor, high-frequency switching network 1 may operate in a half-bridge resonance state to perform high-frequency chopping on low-frequency AC input voltage Vin. If the frequency of the switching circuit may not reach the resonance frequency, the high-frequency switching network 1 may operate in a half-bridge converter state to perform high-frequency chopping on low-frequency AC input voltage Vin. The specific type of the half-bridge converter can be related to the composition and connection mode of the energy storage module. If the energy storage module only includes an inductor, high-frequency switching network 1 may operate in a half-bridge buck state to perform high-frequency chopping on low-frequency AC input voltage Vin.

In the negative half cycle of the low-frequency AC input voltage Vin (e.g., the voltage at port L is less than the voltage at port N), power switch Q1 may remain on, and power switches Q2 and Q3 can be turned on alternately in the high-frequency PWM mode to perform high-frequency chopping on low-frequency AC input voltage Vin to generate a high-frequency AC signal. For example, when power switch Q2 is turned on and power switch Q3 is turned off, low-frequency AC input voltage Vin can charge the energy storage module and the primary winding, and may provide power for the post-stage circuit or load. In addition, low-frequency AC input voltage Vin can charge capacitor C3 through the body diode of power switch Q4. If power switch Q4 has no body diode, power switch Q4 can be turned on to charge capacitor C3. When power switch Q3 is turned on and power switch Q2 is turned off, the energy storage module and the primary winding may be discharged to supply power to the post-stage circuit or load. In this process, if the energy storage module includes a capacitor, high-frequency switching network 1 may operate in a half-bridge resonance state to perform high-frequency chopping on low-frequency AC input voltage Vin. If the frequency of the switching circuit cannot reach the resonance frequency, high-frequency switching network 1 may operate in a half-bridge converter state to perform high-frequency chopping on low-frequency AC input voltage Vin. The specific type of the half-bridge converter can be related to the composition and connection mode of the energy storage module. If the energy storage module only includes an inductor, high-frequency switching network 1 may operate in a half-bridge buck state to perform high-frequency chopping on low-frequency AC input voltage Vin.

In the second operating mode, the energy storage capacitor may supply power to the post-stage circuit or load in a full-bridge state. Power switches Q3 and Q4 can be turned on alternately in a high-frequency PWM manner to perform high-frequency chopping on the voltages of capacitors C2 and C3 respectively to generate a high-frequency AC signal. For example, when power switch Q3 is turned on and power switch Q4 is turned off, capacitor C2 can be discharged to supply power to the post-stage circuit or load. When power switch Q4 is turned on and power switch Q3 is turned off, capacitor C3 may be discharged to supply power to the post-stage circuit or load. In this process, if the energy storage module includes a capacitor, high-frequency switching network 1 may operate in a full-bridge resonance state to perform high-frequency chopping on the voltages of capacitors C2 and C3 alternately. If the switching frequency of the switching circuit may not reach the resonance frequency, high-frequency switching network 1 may operate in a full-bridge converter state to perform high-frequency chopping on the voltages of capacitors C2 and C3 alternately. The specific type of the full-bridge converter can be related to the composition and connection mode of the energy storage module. If the energy storage module only includes an inductor, high-frequency switching network 1 may operate in a full-bridge buck state to alternately perform high-frequency chopping on the voltages of capacitors C2 and C3. In this embodiment, when the switching power supply circuit supplies power to the post-stage circuit or load, the above-mentioned two operating modes can be performed individually or in any suitable combination.

Figure 13:
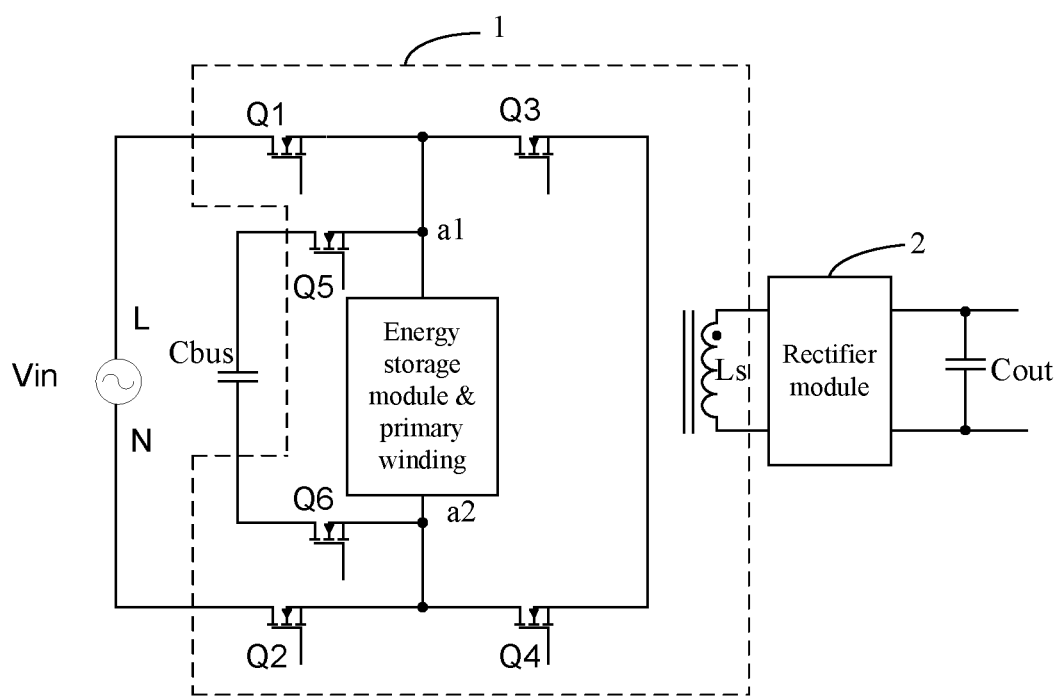
FIG. 13 is a schematic circuit diagram of a ninth example switching power supply circuit, in accordance with embodiments of the present invention.

Referring now to FIG. 13, shown is a schematic circuit diagram of a ninth example switching power supply circuit, in accordance with embodiments of the present invention. In this particular example, the switching power supply circuit can include energy storage capacitor Cbus, high-frequency switching network 1, and rectifier module 2. High-frequency switching network 1 can be coupled to energy storage capacitor Cbus, may receive a low-frequency AC input voltage Vin, can charge energy storage capacitor Cbus, and may perform high-frequency chopping on low-frequency AC input voltage Vin and/or the voltage of the energy storage capacitor Cbus to generate a high-frequency AC signal. Rectifier module 2 can be coupled to high-frequency switching network 1, may receive the high-frequency AC signal, can rectify the high-frequency AC signal, and may generate a DC signal. High-frequency switching network 1 can include an energy storage module, a switching circuit, and a transformer. The switching circuit can include a low-frequency AC input terminal, and power switches Q1, Q2, Q3, Q4, Q5, and Q6. Power switches Q1 and Q2, and the low frequency AC input terminal can connect in series between nodes a1 and a2. Power switches Q3 and Q4 can connect in series between nodes a1 and a2. The energy storage module and the primary winding can be coupled between nodes a1 and a2. Power switches Q5 and Q6 and energy storage capacitor Cbus can connect in series between nodes a1 and a2. The low-frequency AC input terminal can include two ports L and N. In this embodiment, the configurations of the energy storage module, the rectifier module, and the transformer of the switching power supply circuit can be substantially similar to those in the first embodiment.

In this embodiment, the switching power supply circuit can operate in the following two operating modes. In the first operating mode, low-frequency AC input voltage Vin may supply power to the post-stage circuit or load in a half-bridge state. In the positive half cycle of the low-frequency AC input voltage Vin (e.g., the voltage at port L is greater than port N), power switches Q2 and Q4 may remain on, and power switches Q1 and Q3 can be turned on alternately in a high-frequency PWM mode to perform high-frequency chopping on low-frequency AC input voltage Vin to output a high-frequency AC signal. For example, when power switch Q1 is turned on and power switch Q3 is turned off, low-frequency AC input voltage Vin can charge the energy storage module and the primary winding, and may provide power for the post-stage circuit or load. In addition, power switches Q5 and Q6 can be turned on to charge energy storage capacitor Cbus. When power switch Q3 is turned on and power switch Q1 is turned off, the energy storage module and the primary winding can be discharged to supply power to the post-stage circuit or load. In this process, if the energy storage module includes a capacitor, high-frequency switching network 1 may operate in a half-bridge resonance state to perform high-frequency chopping on low-frequency AC input voltage Vin. If the frequency of the switching circuit may not reach the resonance frequency, high-frequency switching network 1 can operate in a half-bridge converter state to perform high-frequency chopping on low-frequency AC input voltage Vin. The specific type of the half-bridge converter can be related to the composition and connection manner of the energy storage module. If the energy storage module only includes an inductor, high-frequency switching network 1 may operate in a half-bridge buck state to perform high-frequency chopping on low-frequency AC input voltage Vin.

In the negative half cycle of the low-frequency AC input voltage Vin (e.g., the voltage at port L is less than the voltage at port N), power switches Q1 and Q3 may remain on, and power switches Q2 and Q4 can be turned on alternately in a high-frequency PWM mode to perform high-frequency chopping on low-frequency AC input voltage Vin to output a high-frequency AC signal. For example, when power switch Q2 is turned on and power switch Q4 is turned off, low-frequency AC input voltage Vin can charge the energy storage module and the primary winding, and may provide power for the post-stage circuit or load. In addition, power switches Q5 and Q6 can be turned on to charge energy storage capacitor Cbus. When power switch Q4 is turned on and power switch Q2 is turned off, the energy storage module and the primary winding may be discharged to supply power to the post-stage circuit or load. In this process, if the energy storage module includes a capacitor, high-frequency switching network 1 may operate in a half-bridge resonance state to perform high-frequency chopping on low-frequency AC input voltage Vin. If the frequency of the switching circuit may not reach the resonance frequency, high-frequency switching network 1 can operate in a half-bridge converter state to perform high-frequency chopping on low-frequency AC input voltage Vin. The specific type of the half-bridge converter can be related to the composition and connection mode of the energy storage module. If the energy storage module only includes an inductor, high-frequency switching network 1 may operate in a half-bridge buck state to perform high-frequency chopping on low-frequency AC input voltage Vin.

In the second operating mode, energy storage capacitor Cbus may supply power to the post-stage circuit or load in a half-bridge state. Power switches Q4 and Q6 may remain on, and power switches Q3 and Q5 can be turned on alternately in a high-frequency PWM manner, in order to perform high-frequency chopping on the voltage of energy storage capacitor Cbus and generate a high-frequency AC signal. For example, when power switch Q5 is turned on and power switch Q3 is turned off, energy storage capacitor Cbus can charge the energy storage module and the primary winding, and may provide power for the post-stage circuit or load. When power switch Q3 is turned on and power switch Q5 is turned off, the energy storage module and the primary winding can be discharged to supply power to the post-stage circuit or load. In this process, if the energy storage module includes a capacitor, high-frequency switching network 1 may operate in a half-bridge resonance state to perform high-frequency chopping on the voltage of energy storage capacitor Cbus. If the frequency of the switching circuit may not reach the resonance frequency, high-frequency switching network 1 can operate in a half-bridge converter state to perform high-frequency chopping on the voltage of energy storage capacitor Cbus. The specific type of the half-bridge converter may be related to the composition and connection mode of the energy storage module. If the energy storage module only includes an inductor, high-frequency switching network 1 may operate in a half-bridge buck state to perform high-frequency chopping on the voltage of energy storage capacitor Cbus. In this embodiment, when the switching power supply circuit supplies power to the post-stage circuit or load, the above-mentioned two operating modes can be performed individually or in any suitable combination.

The switching power supply circuits described in the first to ninth embodiments above are all isolated switching power supply circuits; that is, the switching power supply circuit can include the transformer. However, the switching power supply circuits described in the first to ninth embodiments can also be converted into a non-isolated switching power supply circuit after a relatively simple transformation. For convenience of description, the following description will take the specific case of the conversion of the switching power supply circuit in the first embodiment into a non-isolated switching power supply circuit as an example, but other embodiments can similarly be converted into a non-isolated switching power supply circuit.

Figure 14:
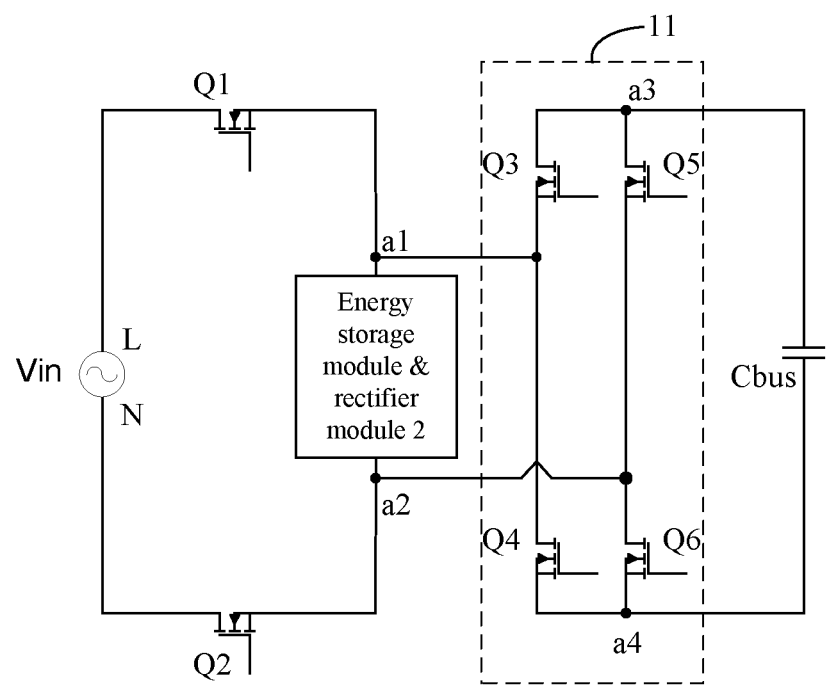
FIG. 14 is a schematic circuit diagram of a tenth example switching power supply circuit, in accordance with embodiments of the present invention.

Referring now to FIG. 14, shown is a schematic circuit diagram of a tenth example switching power supply circuit, in accordance with embodiments of the present invention. In this particular example, high-frequency switching network 1 may not include a transformer, and the energy storage module and rectifier module 2 can be coupled between nodes a1 and a2. Rectifier module 2 can be a rectifier circuit in any suitable manner, such as full-wave rectification or full-bridge rectification. The full-bridge rectification will be described below, as just one example. In this embodiment, the energy storage module and the switching circuit can be substantially similar to those in the first embodiment. The specific connection mode of the energy storage module and rectifier module 2 may be related to the composition and connection mode of the energy storage module.

Figure 15:
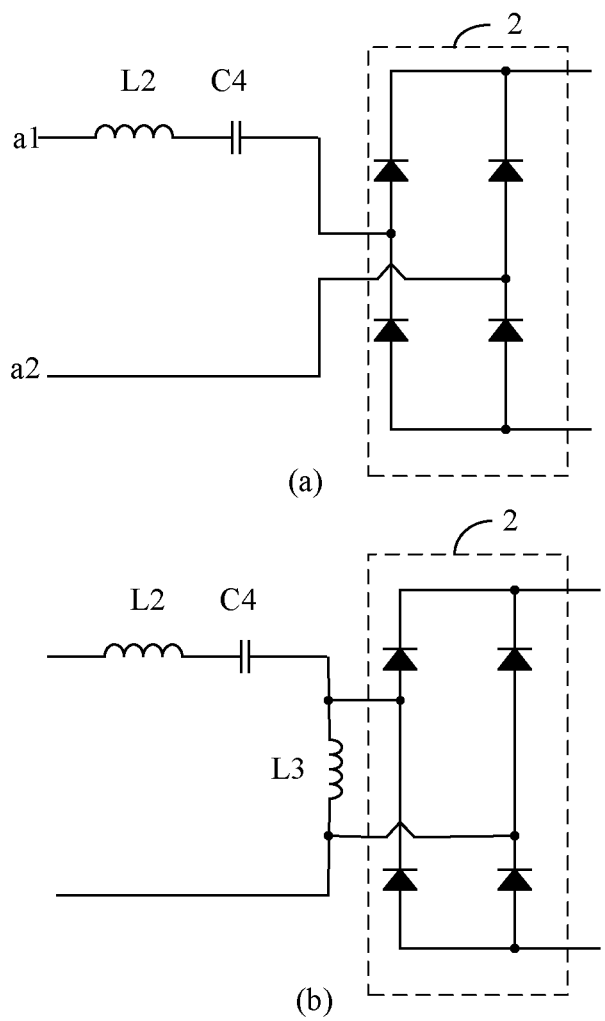
FIG. 15 is a schematic diagram of an example energy storage module and rectifier module in the tenth example switching power supply circuit, in accordance with embodiments of the present invention.

Referring now to FIG. 15, shown is a schematic diagram of an example energy storage module and rectifier module in the tenth example switching power supply circuit, in accordance with embodiments of the present invention. Two schematic diagrams of the energy storage module and rectifier module 2 are given in (a) and (b) parts of FIG. 15. As shown in (a) of FIG. 15, the energy storage module can include inductor L2 and capacitor C4. Inductor L2, capacitor C4, and the two input terminals of rectifier module 2 can connect in series between nodes a1 and a2. As shown in (b) of FIG. 15, the energy storage module can include inductor L2, capacitor C4, and inductor L3. Inductor L2, capacitor C4, and inductor L3 can connect in series between nodes a1 and a2, and inductor L3 is connected between two input terminals of rectifier module 2. In other embodiments, the energy storage module can also be other suitable combinations of inductor(s) and capacitor(s).

In this embodiment, the switching power supply circuit can operate in the first, second, third, and fourth operating mode as described in the first embodiment, and the specific operating modes of the above four operating modes in this embodiment can be substantially similar to those in the first embodiment. In this embodiment, when the switching power supply circuit supplies power to the post-stage circuit or load, the above four operating modes can be performed individually or in any suitable combination. It should be noted that the second, third, fourth, fifth, sixth, seventh, eighth, and the ninth embodiment can all be transformed in a similar way, whereby the transformer is not included, such that the energy storage module and the rectifier module are coupled between the first node and the second node, and such that the switching power supply circuit of the above embodiments can be converted into a non-isolated switching power supply circuit.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A switching power supply circuit, comprising:
    a) an energy storage capacitor;
    b) a high-frequency switching network coupled to the energy storage capacitor, and being configured to receive a low-frequency AC input voltage, to charge the energy storage capacitor, to perform high-frequency chopping on the low-frequency AC input voltage and/or a voltage of the energy storage capacitor, and to generate a high-frequency AC signal;
    c) a rectifier module coupled to the high-frequency switching network, and being configured to receive the high-frequency AC signal, to rectify the high-frequency AC signal, and to generate a DC signal; and
    d) wherein the high-frequency switching network comprises an energy storage module and a switching circuit, the switching circuit having a low-frequency AC input terminal, a first power switch, and a second power switch that are coupled in series between a first node and a second node, wherein the energy storage module is coupled between the first node and the second node.

2. The switching power supply circuit of claim 1, wherein the energy storage module is charged and discharged by controlling switching states of the switching circuit, in order to perform high-frequency chopping on the low-frequency AC input voltage and/or the voltage of the energy storage capacitor.

3. The switching power supply circuit of claim 2, wherein the high-frequency switching network further comprises a transformer, the energy storage module is coupled to a primary winding of the transformer, and the rectifier module is coupled to a secondary winding of the transformer.

4. The switching power supply circuit of claim 2, wherein the energy storage module is coupled to the rectifier module.

5. The switching power supply circuit of claim 3, wherein the switching circuit further comprises a full-bridge circuit, wherein the energy storage module and the primary winding are respectively coupled between the first and second nodes, two ports of a first terminal of the full-bridge circuit are coupled to the first and second nodes, and a second terminal of the full-bridge circuit is coupled to the energy storage capacitor.

6. The switching power supply circuit of claim 5, wherein the full-bridge circuit comprises a third power switch, a fourth power switch, a fifth power switch, and a sixth power switch, and the third and fourth power switches are connected in series between a third node and a fourth node, and the fifth and sixth power switches are connected in series between the third and fourth nodes, the two ports of the first terminal of the full-bridge circuit are a common node of the third and fourth power switches and a common node of the fifth and sixth power switches respectively, and the energy storage capacitor is coupled between the third and fourth nodes.

7. The switching power supply circuit of claim 6, wherein the switching circuit further comprises a seventh power switch and an eighth power switch, wherein the seventh and eighth power switches are connected in series between the first and second nodes.

8. The switching power supply circuit of claim 6, wherein the switching circuit further comprises a ninth power switch, wherein the ninth power switch and the energy storage capacitor are connected in series between the third and fourth nodes.

9. The switching power supply circuit of claim 8, wherein the high-frequency switching network further comprises a first capacitor, and the first capacitor is coupled to the third node and the fourth node.

10. The switching power supply circuit of claim 6, wherein the fifth power switch comprises a power transistor or a diode.

11. The switching power supply circuit of claim 3, wherein:
a) the energy storage capacitor comprises a second capacitor and a third capacitor;
b) the switching circuit further comprises a third power switch and a fourth power switch;
c) the energy storage module and the primary winding are coupled between the first node and the second node;
d) the third power switch and the fourth power switch are connected in series between a third node and a fourth node;
e) the second capacitor and the third capacitor are connected in series between the third node and the fourth node; and
f) a common node of the third power switch and the fourth power switch, and a common node of the second capacitor and the third capacitor, are respectively coupled to the first node and the second node.

12. The switching power supply circuit of claim 3, wherein:
a) the switching circuit further comprises a third power switch, a fourth power switch, a fifth power switch and a sixth power switch;
b) the third power switch and the fourth power switch are connected in series between the first node and the second node;
c) the energy storage module and the primary winding are connected in series between the first node and the second node; and
d) the fifth power switch, the sixth power switch, and the energy storage capacitor are connected in series between the first node and the second node.

13. The switching power supply circuit of claim 4, wherein:
a) the switching circuit further comprises a full-bridge circuit;
b) the energy storage module and the rectifier module are coupled between the first node and the second node;
c) two ports of a first terminal of the full-bridge circuit are respectively coupled to the first node and the second node; and
d) the energy storage capacitor is coupled between two ports of a second terminal of the full-bridge circuit.

14. The switching power supply circuit of claim 2, wherein the energy storage module comprises at least one inductor and/or at least one capacitor to form different topological structures differing from the switching circuit.

15. The switching power supply circuit of claim 3, wherein the energy storage module comprises a first inductor, and the first inductor and the primary winding are connected in series between a first node and a second node.

16. The switching power supply circuit of claim 3, wherein the energy storage module comprises a fourth capacitor, and the fourth capacitor and the primary winding are connected in series between a first node and a second node.

17. The switching power supply circuit of claim 16, wherein the energy storage module further comprises a second inductor, and the second inductor, the fourth capacitor, and the primary winding are connected in series between the first node and the second node.

18. The switching power supply circuit of claim 17, wherein the energy storage module comprises a fifth capacitor, and the fifth capacitor is connected in parallel with the primary winding.

19. The switching power supply circuit of claim 2, wherein the high-frequency switching network operates in a half-bridge and/or full-bridge state to perform high-frequency chopping on the low-frequency AC input voltage and/or the voltage of the energy storage capacitor, by controlling the switching states of the switching circuit.

20. The switching power supply circuit of claim 6, wherein:
a) in a positive half cycle of the low-frequency AC input voltage, the second power switch and the sixth power switch are always on, and the first power switch and the fourth power switch are turned on alternately in a high-frequency PWM mode; and
b) in a negative half cycle of the low-frequency AC input voltage, the first power switch and the fifth power switch are always on, and the second power switch and the third power switch are turned on alternately in a high-frequency PWM mode, in order to perform high-frequency chopping on the low-frequency AC input voltage, such that the low-frequency AC input voltage provides power for a post-stage circuit or a load in a half-bridge state.

* * * * *